US011917730B2

(12) United States Patent
Nosrati et al.

(10) Patent No.: US 11,917,730 B2
(45) **Date of Patent: *Feb. 27, 2024**

(54) INTEGRATED DEVICE AND METHOD FOR ENHANCING HEATER LIFE AND PERFORMANCE

(71) Applicant: Watlow Electric Manufacturing Company, St. Louis, MO (US)

(72) Inventors: Mohammad Nosrati, Redwood City, CA (US); Roger Brummell, Hannibal, MO (US); Timothy Tompkins, San Jose, CA (US)

(73) Assignee: WATLOW ELECTRIC MANUFACTURING COMPANY, St. Louis, MO (US)

( * ) Notice: Subject to any disclaimer, the term of this patent is extended or adjusted under 35 U.S.C. 154(b) by 1132 days.

This patent is subject to a terminal disclaimer.

(21) Appl. No.: 16/528,918

(22) Filed: Aug. 1, 2019

(65) Prior Publication Data

US 2019/0357311 A1 Nov. 21, 2019

Related U.S. Application Data

(63) Continuation of application No. 15/283,769, filed on Oct. 3, 2016, now Pat. No. 10,420,173.

(60) Provisional application No. 62/235,719, filed on Oct. 1, 2015.

(51) Int. Cl.

| | |
|---|---|
| ***H05B 3/00*** | (2006.01) |
| ***H05B 1/02*** | (2006.01) |
| ***H05B 3/40*** | (2006.01) |
| ***H05B 3/48*** | (2006.01) |

(52) U.S. Cl.
CPC ......... *H05B 3/0014* (2013.01); *H05B 1/0291* (2013.01); *H05B 3/40* (2013.01); *H05B 3/48* (2013.01); *H05B 2203/012* (2013.01)

(58) Field of Classification Search
None
See application file for complete search history.

(56) References Cited

U.S. PATENT DOCUMENTS

| | | | | |
|---|---|---|---|---|
| 5,872,890 | A | 2/1999 | Lacombe | |
| 8,162,232 | B2 * | 4/2012 | Knoeppel | F24H 9/45 237/8 R |
| 10,420,173 | B2 * | 9/2019 | Nosrati | H05B 3/48 |

(Continued)

FOREIGN PATENT DOCUMENTS

| | | |
|---|---|---|
| CN | 1048643 | 1/1991 |
| CN | 101854750 | 10/2010 |

(Continued)

*Primary Examiner* — Thor S Campbell
(74) *Attorney, Agent, or Firm* — Burris Law, PLLC

(57) ABSTRACT

A control system for controlling an operation of a resistive heater includes a dielectric parameter determination module, a prediction module, and a heater operation control module. The dielectric parameter determination module determines a material property of a dielectric material of the resistive heater when the resistive heater is in an active mode. The prediction module predicts a life expectancy of the resistive heater based on the material property of the dielectric material. The heater operation control module changes operation of the resistive heater based on the material property and the life expectancy.

20 Claims, 2 Drawing Sheets

(56) References Cited

U.S. PATENT DOCUMENTS

Figure 1:
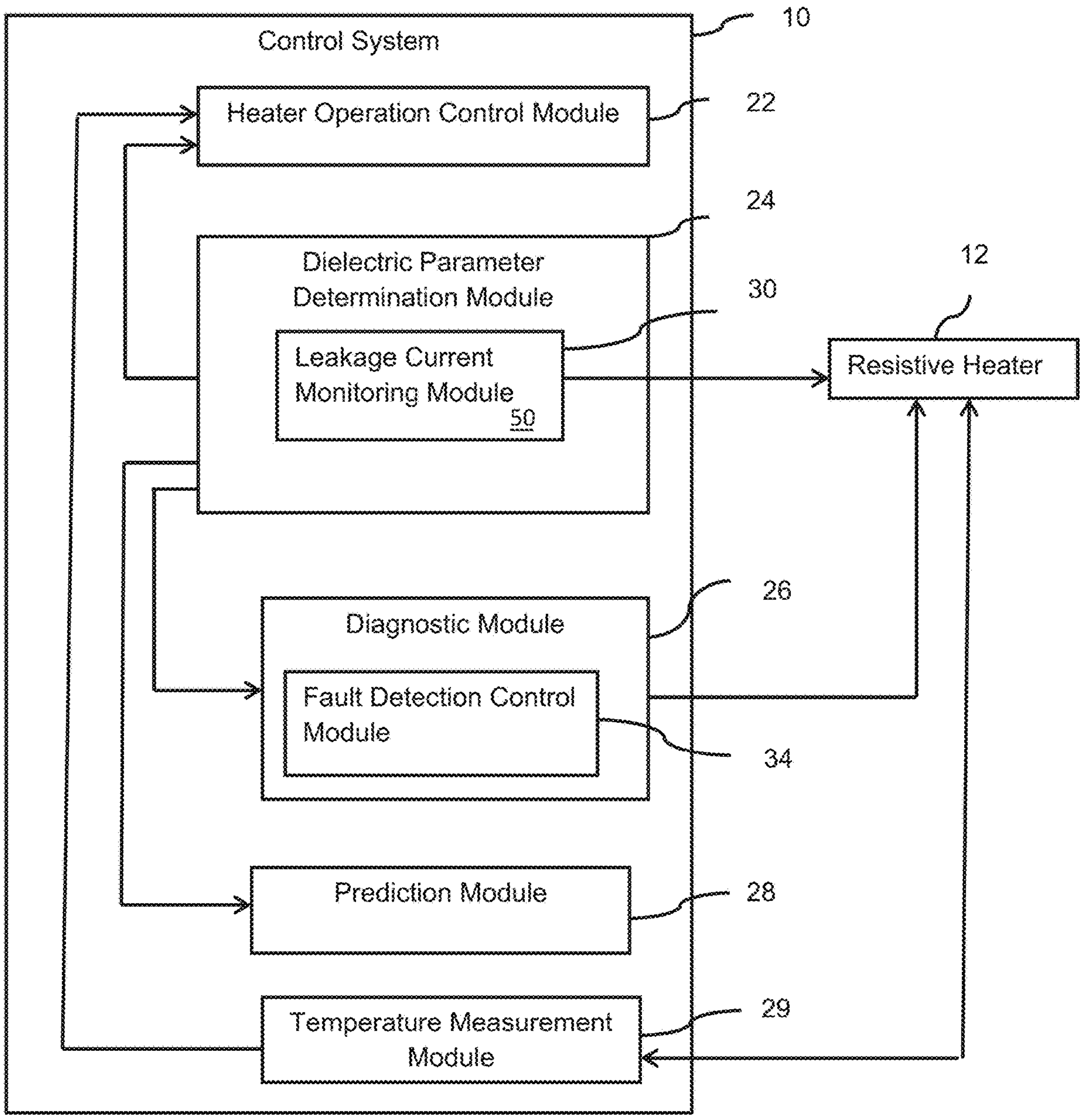

| | | | | |
|---|---|---|---|---|
| 2003/0146204 | A1 | 8/2003 | Kaastra | |
| 2005/0218912 | A1* | 10/2005 | Schroeder | F24H 9/0036 324/663 |
| 2007/0125764 | A1* | 6/2007 | Knoeppel | H05B 1/0283 219/497 |
| 2014/0343747 | A1* | 11/2014 | Culbertson | H05B 1/0236 700/300 |
| 2019/0357311 | A1* | 11/2019 | Nosrati | H05B 1/0291 |

FOREIGN PATENT DOCUMENTS

| | | |
|---|---|---|
| JP | H0611530 | 1/1994 |
| JP | 2012253222 | 12/2012 |

* cited by examiner

INTEGRATED DEVICE AND METHOD FOR ENHANCING HEATER LIFE AND PERFORMANCE

CROSS-REFERENCE TO RELATED APPLICATIONS

This application is a continuation application of U.S. Ser. No. 15/283,769, filed Oct. 3, 2016, which claims the benefit of and priority to U.S. provisional application Ser. No. 62/235,719 filed on Oct. 1, 2015. The disclosure of the above application is incorporated herein by reference in its entirety.

FIELD

The present disclosure relates to resistive heating devices, and more particularly to control systems and methods for monitoring and controlling operation of the resistive heating devices.

BACKGROUND

The statements in this section merely provide background information related to the present disclosure and may not constitute prior art.

Resistive heating devices, such as tubular heaters, are generally designed to have a predetermined life expectancy and maximum allowable temperature if operated under certain operating conditions. The performance and the life expectancy of the heating devices generally depend on the material properties of the constituent components of the heating devices. When one of the constituent components degrades over time to an unacceptable degree and fails, the entire heating device may fail to function properly. The maximum allowable temperature of the heating device depends on reliability of the constituent components. When one of the constituent components cannot withstand an elevated operating temperature and fail, the entire heating device may also fail.

In addition to the material properties and reliability of the constituent components of the heating device, the life expectancy and maximum allowable temperature of the heating devices are affected by operating conditions and operating modes. For example, the heating devices may have a relatively shorter life expectancy and relatively lower maximum allowable temperature if operated in vacuum environment with low partial pressure of oxygen, or in a rapid ramp-up and ramp-down speed. In view of the various factors that affect performance of the heating device, it is difficult to predict the life expectancy and maximum allowable temperature of the heating devices under a given operating condition.

SUMMARY

In one form of the present disclosure, a control system for controlling an operation of a resistive heater includes a dielectric parameter determination module, a prediction module, and a heater operation control module. The dielectric parameter determination module determines a material property of a dielectric material of the resistive heater when the resistive heater is in an active mode. The prediction module predicts a life expectancy of the resistive heater based on the material property of the dielectric material. The heater operation control module changes operation of the resistive heater based on the material property and the life expectancy.

In another form, a method for controlling a resistive heater includes: determining a material property of a dielectric material of the resistive heater when the resistive heater is in an active mode; predicting a life expectancy of the resistive heater based on the material property of the dielectric material; and controlling the resistive heater based on the material property and the life expectancy.

Further areas of applicability will become apparent from the description provided herein. It should be understood that the description and specific examples are intended for purposes of illustration only and are not intended to limit the scope of the present disclosure.

DRAWINGS

Figure 2:
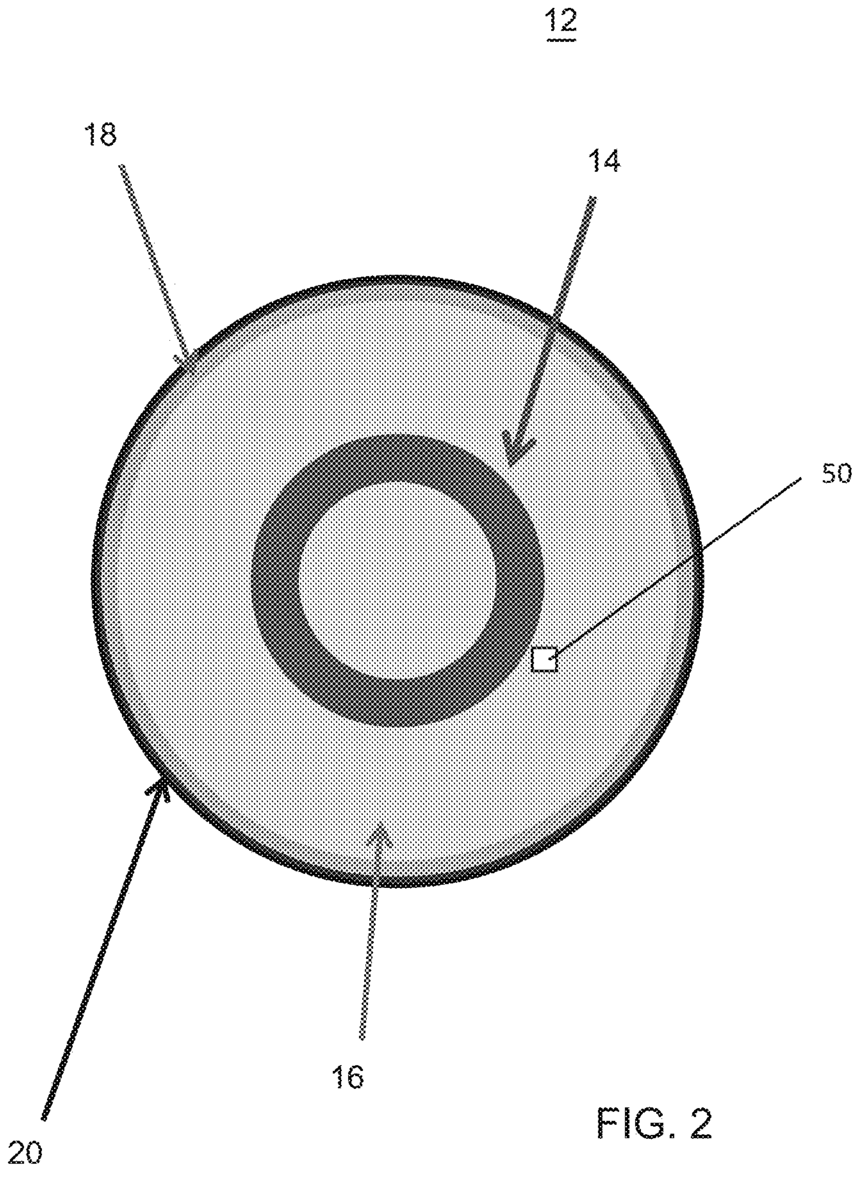

In order that the disclosure may be well understood, there will now be described various forms thereof, given by way of example, reference being made to the accompanying drawings, in which:

FIG. 1 is a block diagram of a control system for a resistive heater constructed in accordance with the teachings of the present disclosure; and FIG. 2 is a schematic, cross-sectional view of the resistive heater of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Referring to FIG. 1, a control system 10 for a resistive heater 12 is shown. The control system 10 is configured to monitor and diagnose performance of a resistive heater 12, detect a fault in the resistive heater 12, and predict the life expectancy of the resistive heater 12 under a given operating condition.

Referring to FIG. 2, the resistive heater 12 may be a tubular heater 12 and include a resistive element 14, a dielectric material 16 surrounding the resistive element 14, a metal sheath 18 surrounding the dielectric material 16, and a protective layer 20 surrounding the metal sheath 18. The resistive element 14 may be a resistive coil or wire and has high electric resistivity to generate heat. The metal sheath 18 has a generally tubular structure to enclose the resistive element 14 and the dielectric material 16 therein, and includes a heat-resistant metal, such as stainless steel, Inconel alloy or other high refractory metals. The protective layer 20 is disposed around the metal sheath 18 to provide further protection for the metal sheath 18 in a corrosive environment or to facilitate rapid heat radiation from the surface of the metal sheath 18 to the surrounding environment. The dielectric material 16 fills in a space defined by the metal sheath 18 and electrically insulates the resistive element 14 from the metal sheath 18. The dielectric material 16 has a predetermined dielectric strength, heat conductivity and may include magnesium oxide (MgO).

During the heater operation, the material properties of the dielectric material 16 may vary with an operating temperature during an operating period. Generally, the dielectric strength of the dielectric material 16 decreases as the operating temperature increases. When the tubular heater 12 is operated at an elevated temperature for a relatively long period of time, the dielectric strength of the dielectric material 16 may significantly decrease, resulting in a dielectric breakdown in the dielectric material 16. The dielectric breakdown causes a short circuit between the resistive element 14 and the metal sheath 18, resulting in a heater failure. Dielectric breakdown is a common cause of heater failure. The dielectric material 16 generally degrades faster than other constituent components of the resistive heater 12 and is the first to fail.

Therefore, the control system 10 according to the present disclosure is configured to monitor the material properties of the dielectric material 16, particularly a change in the dielectric property/strength of the dielectric material 16 when the heater 12 is in an active mode. The dielectric parameters being monitored may be used to diagnose performance of the heater 12, detect a fault in the heater 12, or predict a life expectancy of the heater 12 under a given operating condition. The dielectric parameters may also be used to provide a feedback to the control system 10 to optimize operation and control of the heater 12.

Referring back to FIG. 1, the control system 10 according to the teachings of the present disclosure includes a heater operation control module 22, a dielectric parameter determination module 24, a diagnostic module 26, and a prediction module 28. The control system 10 may further include a temperature measurement module 29 for monitoring and measuring a temperature of the heater 12.

The heater operation control module 22 controls the operation of the heater 12 based on input parameters, such as a desired operating temperature, a desired ramp-up/ramp-down speed, and/or a desired heating duration.

The dielectric parameter determination module 24 dynamically monitors and determines a dielectric parameter of the heater 12 when the heater 12 is in an active mode (i.e., when the heater is operating). The dielectric parameter as used herein refers to a parameter that can provide an indication of the dielectric property of the dielectric material 16 under the operating conditions. The dielectric property of the dielectric material 16 varies with an operating temperature and operating time, and may affect the proper functioning of the heater 12, if it decreases to an unacceptable degree.

In the one form, the dielectric parameter may be a change in a leakage current flowing through the dielectric material 16. The amount of the leakage current through the dielectric material 16 provides an indication of a change in the dielectric property, strength or integrity of the dielectric material 16. In one form, an integrated device 50 is used to measure leakage current or other current parameters. The integrated device 50 may be disposed within the heater 12 or on an exterior portion thereof and in electrical communication with the lead wires or power pins (not shown). In another form, the integrated device 50 may be integrated within the leakage current monitoring module 30 as described in greater detail below. The integrated device 50 may be, by way of example, a transducer capable of measuring current in micro or milliamp levels.

Therefore, the dielectric parameter determination module 24 may include a leakage current monitoring module 30 for monitoring and measuring a leakage current through the dielectric material 16, and determining a change in the leakage current. The leakage current monitoring module 30 measures and records the leakage current changes as a function of time and temperature. It is understood that any parameters other than the leakage current may be used without departing from the scope of the present disclosure as long as the parameters can provide information about the dielectric strength and dielectric property of the dielectric material 16.

The diagnostic module 26 receives the dielectric parameter from the dielectric parameter determination module 24 and diagnoses performance of the heater 12 based on the dielectric parameter, such as a change in the leakage current. For example, a heater may have a life expectancy of 90 days at an operating temperature of 900° C. before the heater shows any sign of failure. The same heater may have a life expectancy of over 350 days at an operating temperature of 800° C. without showing any sign of failure. Therefore, the diagnostic module 26 may periodically or regularly analyze the dielectric parameter or information about the leakage current received from the dielectric parameter determination module 24 based on a stored program to detect an abnormality in the heater.

The diagnosing module 26 may further include a fault detection control (FDC) module 34, which sets a threshold for a fault in the heater. During heater operation, a small amount of leakage current may flow through the dielectric material 16. As the resistive heater 12 continues to be operated at an elevated temperature for a prolonged period of time, the amount of leakage current may increase abruptly. When the amount of the leakage current reaches the threshold, the FDC module 34 may determine that a dielectric breakdown is forthcoming and generates a warning signal to alert the operator or generates an enable signal to turn on a switch to shut off power supply to the resistive heater 12.

Alternatively, the diagnostic module 26 may diagnose the performance of the resistive heater 12 based on an increase rate of the leakage current. When the leakage current increases at a rate faster than a threshold rate, the diagnostic module 26 may determine that the heater 12 is not operated in an optimum manner. A signal may be generated accordingly to provide such information to the operator.

The prediction module 28 receives the dielectric parameters from the dielectric parameter determination module 22, calculates a constant factor (K), and predicts a life expectancy of the heater 12 under the monitored operating conditions. The prediction module 28 may include pre-stored correlations among operating temperatures, dielectric parameters such as leakage current, and time. The dielectric parameter may be sent to the prediction module 28, which calculates a constant factor (K) based on the dielectric parameter. The prediction module 28 then calculates and predicts the life expectancy of the heater at a given temperature and time based on the constant factor (K). The prediction module 28 includes a mathematical formula or algorithm to dynamically predict the life expectancy of the heater at a given temperature and time.

Optionally, the dielectric parameter can also be sent to the heater operation control module 22 for a closed-loop feedback control. Based on the dielectric parameter as a feedback, the heater operation control module 22 may optimize control of the heater 12 by changing the operating temperature and/or ramp up/ramp down speed of the heater 12, in order to improve the heater performance and life expectancy.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A control system for controlling an operation of a resistive heater, the control system comprising:

a dielectric parameter determination module for determining a material property of a dielectric material of the resistive heater when the resistive heater is in an active mode;

a prediction module for predicting a life expectancy of the resistive heater based on the material property of the dielectric material; and a heater operation control module for changing operation of the resistive heater based on the material property and the life expectancy.

2. The control system according to claim 1, wherein the material property of the dielectric material is dielectric strength of the dielectric material when the resistive heater is in the active mode.

3. The control system according to claim 1, wherein the dielectric parameter determination module further determines a change in the material property of the dielectric material.

4. The control system according to claim 3, wherein the dielectric parameter determination module further includes a monitoring module including a transducer for monitoring a leakage current through the dielectric material of the resistive heater.

5. The control system according to claim 4, wherein the dielectric parameter determination determines the change in the material property based on the leakage current through the dielectric material of the resistive heater.

6. The control system according to claim 5, further comprising a diagnostic module that determines performance of the resistive heater based on a comparison of the leakage current and a threshold leakage current.

7. The control system according to claim 6, wherein the diagnostic module further includes a fault detection control module that generates a warning signal when the leakage current reaches the threshold leakage current.

8. The control system according to claim 1, wherein the prediction module includes correlations among the material property, the life expectancy, and an operating temperature of the resistive heater.

9. The control system according to claim 1, wherein the prediction module determines a constant factor (K) based on the material property of the dielectric material.

10. The control system according to claim 1, wherein the heater operation control module operates the resistive heater based on the material property of the dielectric material by changing at least one of operating temperature, ramp up speed and ramp down speed.

11. A method for controlling a resistive heater, comprising:

determining a material property of a dielectric material of the resistive heater when the resistive heater is in an active mode;

predicting a life expectancy of the resistive heater based on the material property of the dielectric material; and controlling the resistive heater based on the material property and the life expectancy.

12. The method according to claim 11, wherein the material property is dielectric strength of the dielectric material when the resistive heater is in the active mode.

13. The method according to claim 12, further comprising determining the dielectric strength based on a leakage current through the dielectric material.

14. The method according to claim 13, further comprising establishing a threshold leakage current, and determining a heater failure when the leakage current reaches the threshold leakage current.

15. The method according to claim 11, further comprising predetermining correlations among the material property of the dielectric material, an operating temperature of the resistive heater and operating time.

16. The method according to claim 11, further comprising controlling the resistive heater based on the material property by changing at least one of operating temperature, ramp up speed and ramp down speed.

17. The method according to claim 11, further comprising defining and calculating a constant factor (K).

18. The method according to claim 17, further comprising predicting the life expectancy of the resistive heater based on the constant factor.

19. The method according to claim 11, further comprising setting up mathematical formula or algorithm into a prediction module to dynamically predict the life expectancy of the resistive heater at a given temperature and time.

20. The method according to claim 11, further comprising providing dielectric parameter changes and correlation factor as a feedback for diagnostic and fault detection control (FDC).

* * * * *